(12) United States Patent
Fu et al.

(10) Patent No.: US 12,704,433 B2
(45) Date of Patent: Aug. 11, 2026

(54) AIR-COOLED ELECTRIC VIBRATING TABLE

(71) Applicant: SUZHOU DONGLING VIBRATION TEST INSTRUMENT CO., LTD, Suzhou (CN)

(72) Inventors: Xiaohong Fu, Suzhou (CN); Tengbo Ye, Suzhou (CN); Lei Qu, Suzhou (CN); Yan Ding, Suzhou (CN); Zhenwei Cao, Suzhou (CN); Wei Sun, Suzhou (CN); Changde Xu, Suzhou (CN); Jiawei Liu, Suzhou (CN); Zhizheng Guan, Suzhou (CN); Lijuan Wang, Suzhou (CN)

(73) Assignee: SUZHOU DONGLING VIBRATION TEST INSTRUMENT CO., LTD, Suzhou (CN)

( * ) Notice: Subject to any disclaimer, the term of this patent is extended or adjusted under 35 U.S.C. 154(b) by 295 days.

(21) Appl. No.: 18/580,510

(22) PCT Filed: Dec. 2, 2021

(86) PCT No.: PCT/CN2021/134985
§ 371 (c)(1),
(2) Date: Jan. 18, 2024

(87) PCT Pub. No.: WO2023/019805
PCT Pub. Date: Feb. 23, 2023

(65) Prior Publication Data

US 2025/0085188 A1 Mar. 13, 2025

(30) Foreign Application Priority Data

Aug. 18, 2021 (CN) ........................ 202110947105.8

(51) Int. Cl.
*G01M 7/02* (2006.01)
*H02K 5/20* (2006.01)
*H02K 33/18* (2006.01)

(52) U.S. Cl.
CPC .............. *G01M 7/02* (2013.01); *H02K 5/207* (2021.01); *H02K 33/18* (2013.01)

(58) Field of Classification Search
USPC ........................................................... 73/668
See application file for complete search history.

(56) References Cited

U.S. PATENT DOCUMENTS

2005/0104697 A1 5/2005 Fletcher

FOREIGN PATENT DOCUMENTS

CN 201203507 Y 3/2009
CN 101793589 A 8/2010

(Continued)

OTHER PUBLICATIONS

International Search Report issued for International Patent Application No. PCT/CN2021/134985, Date of mailing: May 16, 2022, 7 pages including English translation.

(Continued)

*Primary Examiner* — Walter L Lindsay, Jr.
*Assistant Examiner* — Warren K Fenwick
(74) *Attorney, Agent, or Firm* — HSML.P.C.

(57) ABSTRACT

An air-cooled electric vibrating table: an improvement of an air-cooled part on an existing basis is that three or more flow guide air duct structural blocks are evenly distributed along the circumferential direction and flatly attached on the surface of an excitation coil or the bottom side thereof, the air duct structural blocks are provided with semi-open grooves that are axially coincident with or close to air inlets, and the grooves of all the air duct structural blocks are oriented to be consistent along the circumferential direction (Continued)

of a cavity; and a positioning block is adjusted to be flow guide blocks inserted obliquely with the axial direction of the vibrating table.

8 Claims, 8 Drawing Sheets

(56) References Cited

FOREIGN PATENT DOCUMENTS

| | | | | |
|---|---|---|---|---|
| CN | 101793589 | B | * | 8/2011 |
| CN | 102338686 | A | | 2/2012 |
| CN | 105149199 | A | | 12/2015 |
| CN | 113624431 | A | | 11/2021 |
| GB | 772930 | A | | 4/1957 |
| JP | 2020043630 | A | | 3/2020 |

OTHER PUBLICATIONS

Written Opinion issued for International Patent Application No. PCT/CN2021/134985, Date of mailing: May 16, 2022, 7 pages including partial English machine translation.

First Office Action issued for Chinese Patent Application No. 202110947105.8, dated Mar. 22, 2023, 6 pages including English machine translation.

* cited by examiner

AIR-COOLED ELECTRIC VIBRATING TABLE

CROSS-REFERENCE TO RELATED APPLICATIONS

The present disclosure is an U.S. national phase application under 35 U.S.C. § 371 based upon international patent application No. PCT/CN2021/134985, filed on Dec. 2, 2021, which itself claims priority of Chinese Patent Application No. 202110947105.8, filed on Aug. 18, 2021, entitled "NOVEL AIR-COOLED ELECTRIC VIBRATING TABLE", the entire content of which is incorporated herein in its entirety.

TECHNICAL FIELD

The present disclosure relates to machinery equipment for vibration testing of industrial products or components, and in particular to a structural optimization of an air-cooling electric vibrating table.

BACKGROUND

In the fields of industrial manufacturing such as electronics, automobiles, aviation, and ships, in order to test the tolerance of various products or components to environmental vibration during assembly, transportation, and execution of designed actions, vibrating tables are often used for testing test. According to the different test objects, there are many types of vibrating tables, among which electric vibrating tables are widely used because of their easy operation, wide detection range, and reliable test results.

The electric vibrating table is a mature device that converts electromagnetic energy into mechanical kinetic energy and provides exciting force to the test object. Its working principle is to set a moving coil with alternating current in the magnetic field based on the electromagnetic effect, so as to generate mechanical, frequency-adjustable excitation force to act on the test object. The magnetic field is generally generated by a cylindrical central magnetic pole and a cylindrical peripheral excitation coil concentrically sleeved on the cylindrical central magnetic pole. In order to enhance and adjust the magnetic field intensity, most electric vibrating tables use excitation coils. At this time, the central magnetic pole, a moving coil, and the excitation coil cooperatively form a "vibration generator". The moving coil moves up and down in a direction of a symmetry axis of the central magnetic pole, supplemented by other necessary components, to cause the test object to vibrate and detect its performance.

During a vibration test, when electromagnetic energy is converted into kinetic energy, part of the energy must be converted into thermal energy, and the "vibration generator" is a heating body. In order to prevent equipment failure, the heat generated needs to be dissipated in time. Usually, the electric vibrating table is provided with a heat dissipation mechanism based on air-cooling or liquid-cooling, which dissipates heat through heat exchange with heating components to achieve local to overall cooling operations. For air-cooling electric vibrating tables, as shown in FIGS. 1 and 2, an air-cooling solution that has been used for a long time is to mount a fan duct at the bottom of the vibrating table to extract air and cool an inner cavity, and the ambient cold air at the top flows downward from the air inlet 131 (shown as four circular holes in FIG. 1) of a vibrating table magnetic cylinder cover 13 through multiple gaps formed between the central magnetic pole 5, the moving coil 31, the excitation coil and an inner wall of a magnetic cylinder 11, and discharged from a bottom of the vibrating table to achieve the purpose of cooling the heating body. The above-mentioned gaps are formed in a body of the excitation coil and a number of positioning blocks 6*a* vertically inserted between an outer side of the excitation coil and the inner wall of the magnetic cylinder, thereby leaving an air flow channel.

In the existing air-cooling solution, the cooling air duct formed by the above structure is axially through and vertically downward to the air outlet at a bottom side of the magnetic cylinder. The flow changes direction and converges only adjacent to the air outlet. A length of a flow path of the cooling airflow in the vibrating table is very limited, which is only slightly greater than an overall height of the vibrating table. Therefore, a contact time between the cooling air flow and the heating component is short, and the cooling effect is not desired. Moreover, since there are usually regular rectangular spacer blocks distributed on a surface of the excitation coil and positioning blocks located between the outer side of the excitation coil and the magnetic cylinder body, the gaps are cut off in a circumferential direction, and a straight downward airflow is blocked by them. A large amount of airflow dead zones are easily generated at a bottom side of the spacer block. The airflow dead zones cannot completely flow through and cover all heating areas, and a large amount of turbulent flows are likely to be formed to prevent the cooling air from flowing normally, resulting in local overheating.

SUMMARY

In view of the shortcomings of the long-term solidification of the above existing technologies, the present disclosure provides a novel air-cooling electric vibrating table to address to improve an air-cooling structure in the vibrating table to change a flow trajectory of a cooling airflow and prolong a cooling time of the airflow on the heating body, so as to solve a problem of heat dissipation and cooling of the vibrating table in a process of realizing functions.

The technical solution of the present disclosure is as follows. A novel air-cooling electric vibrating table includes a magnetic cylinder body, a magnetic cylinder cover, a magnetic cylinder bottom, a lower air cover, and an upper cover. The magnetic cylinder body is internally provided with a central magnetic pole, a moving coil, and an excitation coil whose central axes coincide and that are arranged from the inside to the outside. The magnetic cylinder cover is provided with air inlets circumferentially distributed corresponding to the excitation coil, the magnetic cylinder bottom supports and fixes the central magnetic pole and carries the excitation coil, the magnetic cylinder bottom is provided with ventilation holes distributed in a projection area of the excitation coil. The ventilation holes are in communication with an air outlet on a bottom side of the lower air cover and externally connected to an air duct and a blower, the moving coil extends upward to a moving coil table above the magnetic cylinder cover, and extends downward from a center of the moving coil table to be connected to a support air spring in an inner cavity of the central magnetic pole. The magnetic cylinder body is provided with air duct structure blocks that are discontinuous and evenly distributed along a circumferential direction of the excitation coil, the air duct structure blocks are arranged at least one place on a surface of the excitation coil and between the excitation coil and the magnetic cylinder bottom, and a shape and a number of the air duct structure blocks provided at each place are the same or different; the air duct structure block is provided with a diversion corner, an outer end corner, and an inner end corner that are distributed in a triangle with curved edges, and a semi-opened groove is provided between the outer end corner and the inner end corner, an opening of each air duct structure block orients a circumferential direction of the cavity and is consistent, a radial position of each vertex of the outer end corner and the inner end corner is located between inner and outer edges of the excitation coil, the semi-opened groove of each air duct structure block provided on the surface of the excitation coil axially coincides with or is adjacent to each air inlet, and the semi-opened groove of each air duct structure block provided between the excitation coil and the magnetic cylinder bottom axially coincides with or is adjacent to the ventilation hole. The cooling airflow flowing through the air duct structure block is locally accumulated at the semi-opened groove, and forms a horizontal lateral flow under the guidance of the semi-opened groove. Along with the downward main body power of the cooling airflow, the contact and heat exchanging time with the heating components of the vibrating table is prolonged.

The above-mentioned novel air-cooling electric vibrating table, further, wherein the semi-opened groove of the air duct structure block is an arc groove or an angled straight-edge groove. The diversion corner of the air duct structure block is a rounded or sharp corner facing away from the semi-opened groove for wind-guided diversion, and a diversion angle ranges from 60° to 110°

The above-mentioned novel air-cooling electric vibrating table, further, a plurality of flow guide blocks are inserted between the excitation coil and an inner wall of the magnetic cylinder body, the flow guiding blocks are axially inclined relative to the central magnetic pole, and the flow guiding blocks located in the same layer of gaps are distributed annularly along an outer cylindrical surface of the excitation coil.

Applying the electric vibrating table of the present disclosure to optimize the air-cooling has significant progress: by improving the structure of the spacer block into a specially shaped air duct structure block and replacing the assembly, the airflow is guided through the air duct, the direction of the cooling airflow is changed from straight downward to multi-strand rotation from top to bottom, and each corner of all gaps is completely covered. In addition, by optimizing an insertion state of the flow guiding block and combining with the diversion effect of the air duct structure block, the cooling airflow form a multi-layered overall airflow without dead ends outside the central magnetic pole, thereby extending the cooling path by tens of times and improving the flow controllability and cooling effect of the cooling airflow for the moving coil, the excitation coil, etc.

Reference signs: 11—magnetic cylinder body, 111—air duct hole, 12—magnetic cylinder bottom, 121—ventilation hole, 13—magnetic cylinder cover, 131, 131*a*, 131*b*—air inlet, 14—lower air cover, 141—air outlet, 15—upper cover, 16—demagnetizing coil, 17—dustproof cover, 21—upper excitation, 22—lower excitation, 31—moving coil, 32—moving coil table, 33—moving coil screw, 41—support air spring, 42—lower guidance, 43—upper guidance, 5—center magnetic pole, 6*a*—positioning block, 6*b*, 6*c* flow guiding block, 7—spacer block, 8, 8*a*, 8*b*—air duct structure block, 81, 81*a*, 81*b*—semi-opened groove, 82, 82*a*, 82*b*—diversion corner, 83—outer end corner, 84—inner end corner, 9—flow guiding structure block, 91—flow guiding rib.

DETAILED DESCRIPTION OF THE EMBODIMENTS

In order to make the purpose, technical solutions and advantages of the present disclosure clearer, the present disclosure will be further described in detail below through examples and in conjunction with the accompanying drawings. It should be understood that the specific embodiments described here are only used to explain the present disclosure and are not used to limit the present disclosure.

The designer of the present disclosure conducted a structural analysis on the vibrating table that is currently widely used in industrial manufacturing fields such as electronics, automobiles, aviation, ships, etc., studied the causes of low internal heat dissipation efficiency under its high-intensity operating state, and innovatively provided a solution to improve the air-cooling effect of the vibrating table, in order to optimize the guidance of cooling airflow within the relatively solidified internal structure and limited space of the vibrating table, extend the airflow path and heat exchange duration, and achieve a more desired cooling effect.

Figure 1:
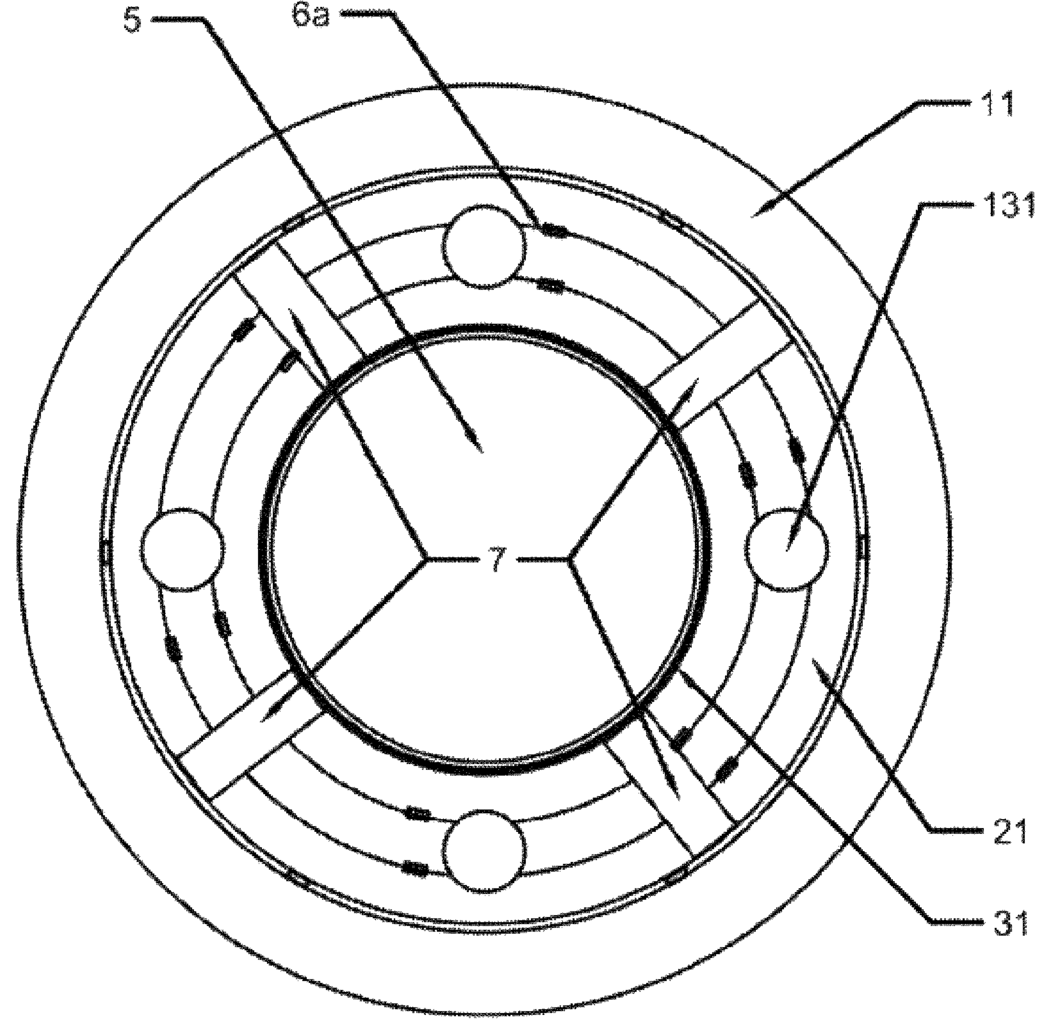
FIG. 1 is a top view of an internal structure of an electric vibrating table in the prior art without a cover.
Figure 2:
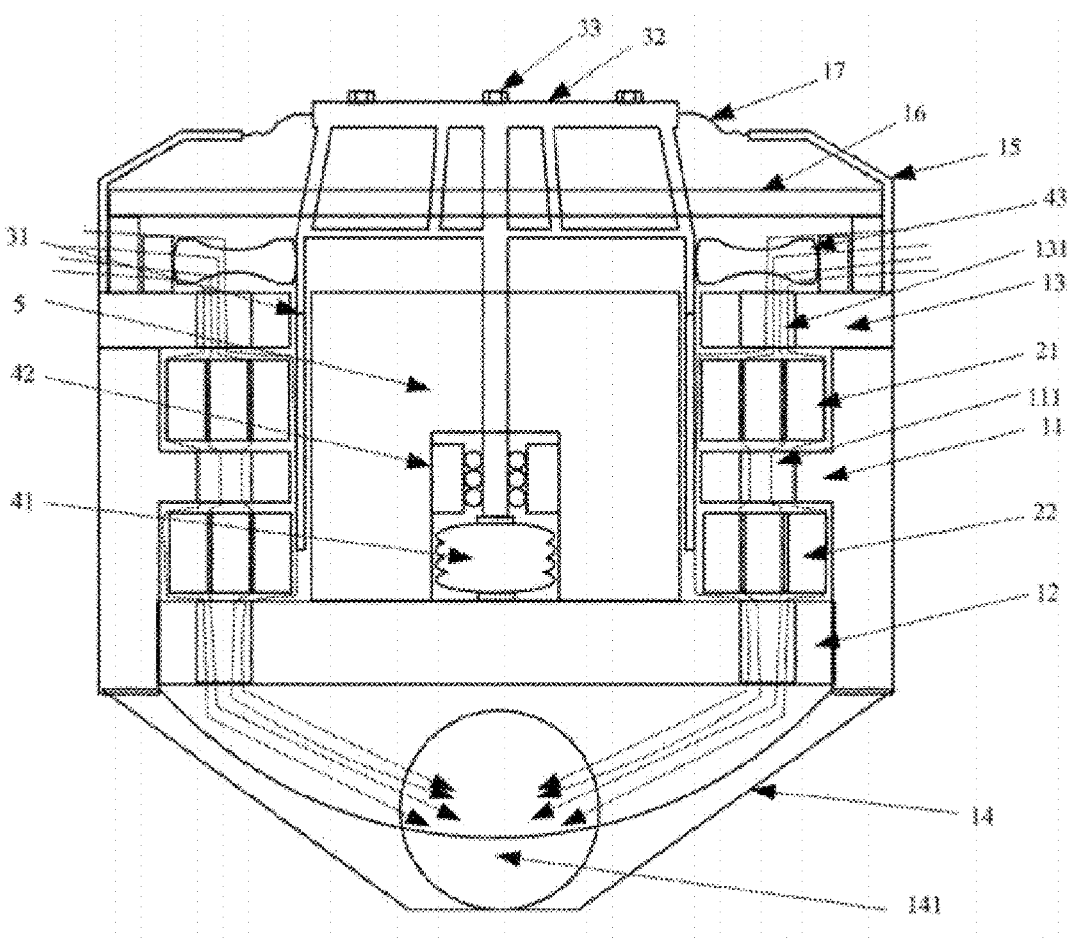
FIG. 2 is an axially cross-sectional view of an air-cooling mechanism of an electric vibrating table in the prior art.

In order to extend the cooling air flow path and heat exchange time inside the vibrating table, the present disclosure is committed to improving the structure of an air-cooling mechanism thereof. In order to understand the structural characteristics of the air-cooling mechanism, a corresponding relationship between the air-cooling mechanism and a vibration main body, and a process of function realization, it is necessary to briefly describe a main structure of the vibrating table and the original air-cooling mechanism. Referring to FIG. 2, the main structure of the electric vibrating table includes a magnetic cylinder body 11, a magnetic cylinder cover 13, a magnetic cylinder bottom 12, a lower air cover 14, and an upper cover 15. In an inner cavity of the magnetic cylinder, a central magnetic pole 5, a moving coil 31, and an excitation coil whose central axes coincide are arranged radially from the inside to the outside. The magnetic cylinder cover 13 is provided with air inlets 131 circumferentially distributed corresponding to the excitation coil. The magnetic cylinder bottom 12 supports and fixes the central magnetic pole 5 and carries the excitation coil, and the magnetic cylinder bottom 12 is provided with ventilation boles 121 distributed in a projection area of the excitation coil. The ventilation holes are in communication with an air outlet 141 on a bottom side of the lower air cover 14 and are externally connected to an air duct and a blower. The moving coil 31 extends upward to a moving coil table 32 above the magnetic cylinder cover, and extends downward from a center of the moving coil table to be connected to a support air spring 41 in an inner cavity of the central magnetic pole. The moving coil table is further connected to moving coil screws 33 configured to fix a test object. Moreover, the inner cavity of the central magnetic pole is further provided with a lower guidance 42 above the support air spring and configured to limit an axial mobility of the moving coil, and an upper guidance 43 on a top side of the magnetic cylinder cover 13 and configured to limit an axial mobility of the moving coil. A dustproof cover 17 is provided between the upper cover and an edge of the moving coil table. A demagnetizing coil 16 is provided between the upper cover and the magnetic cylinder cover 13. The above-mentioned excitation coil forms fine and loose gaps during a coil winding process, and is separated into an inner and outer multi-layers structure with more than one layer of gaps by positioning blocks inserted in the excitation coil. Positioning blocks forming gaps are also distributed and inserted between an outer side of the excitation coil and an inner wall of the magnetic cylinder body. At the same time, a gap fit is also formed between the moving coil and the excitation coil.

Furthermore, as a preferred embodiment of a double excitation electric vibrating table, a middle portion of the magnetic cylinder body is provided with an annular support protrusion extending inwardly. The excitation coil includes an upper excitation 21 and a lower excitation 22 that are spaced up and down in the magnetic cylinder body based on the support protrusion and positioned in a stacked manner, and the support protrusion is correspondingly provided with an air duct hole 111 that penetrates from top to bottom. In this way, in addition to other necessary structural components, multiple longitudinal cooling air ducts are formed. Based on the above-mentioned external fan duct, a negative pressure is formed between the magnetic cylinder bottom and the lower air cover, thereby inducing cooling airflow to provide airflow dynamic support. The airflow path of the main body is shown as a thin line in FIG. 2. Air is sucked from a side of the upper cover, blown into a surface of the upper excitation from the air inlet, diffused and flowed downward from each gap, and then passed downward from the air duct hole to a surface of the lower excitation and diffused again to flow downward from each gap, and finally exhausted outward through the ventilation holes and the air outlet.

On the basis of the introduction of the main structure of the electric vibrating table and the conventional air-cooling mechanism, the structural optimization improvements of the air-cooling mechanism according to the present disclosure mainly include the following: the magnetic cylinder body is provided with air duct structure blocks 8 that are discontinuous and evenly distributed along a circumferential direction of the excitation coil (for replacing the conventional spacer blocks 7 or expanding the functionality of the spacer blocks). The air duct structure blocks are arranged at least one place on a surface of the excitation coil and between the excitation coil and the magnetic cylinder bottom, and a shape and a number of the air duct structure blocks provided at each place can be the same or different. According to the common appearance characteristics of the air duct structure blocks, it is provided with semi-opened grooves that are axially coincide with or adjacent to the air inlet. Openings of all semi-opened grooves are oriented in a clockwise or counterclockwise along a circumferential direction of the excitation coil. In addition, based on the above-mentioned structure of the double excitation electric vibrating table, the air duct structure block can be optionally provided in any one or more places between the magnetic cylinder cover 13 and the surface of the upper excitation, between a bottom surface of the upper excitation and the support protrusions, between the support protrusions and the surface of the lower excitation, and between a bottom surface of the lower excitation and the magnetic cylinder bottom. Certainly, for each placing point, a number of air duct structure blocks should to be more than three to form closed-loop airflow.

In order to specifically understand the functional implementation of the improved structure of the spacer block: the cooling air flow is normally sent downward perpendicular to the surface of the excitation coil, and is dispersed in all directions when being in contact with the surface of the excitation coil. However, the conventional spacer block 7, which is narrow and has straight sides, cannot effectively guide the air flow, and the cooling air flow still maintains a straight downward circulation path. The air duct structure block is used to replace the conventional spacer block to effectively guide the dispersed cooling airflow, so that it forms a rotating airflow around an axial direction of the air inlet on a side of the opening, which provides a good start for extending the circulation path. At the same time, along with the main force of the downward cooling airflow, the openings of all semi-opened grooves are oriented in the same direction, aiming to meet the integrity of the air duct drainage, avoiding the formation of cross-flow and airflow dead zones, and prolonging a contact and heat exchanging time with the heating components of the vibrating table.

Figure 3:
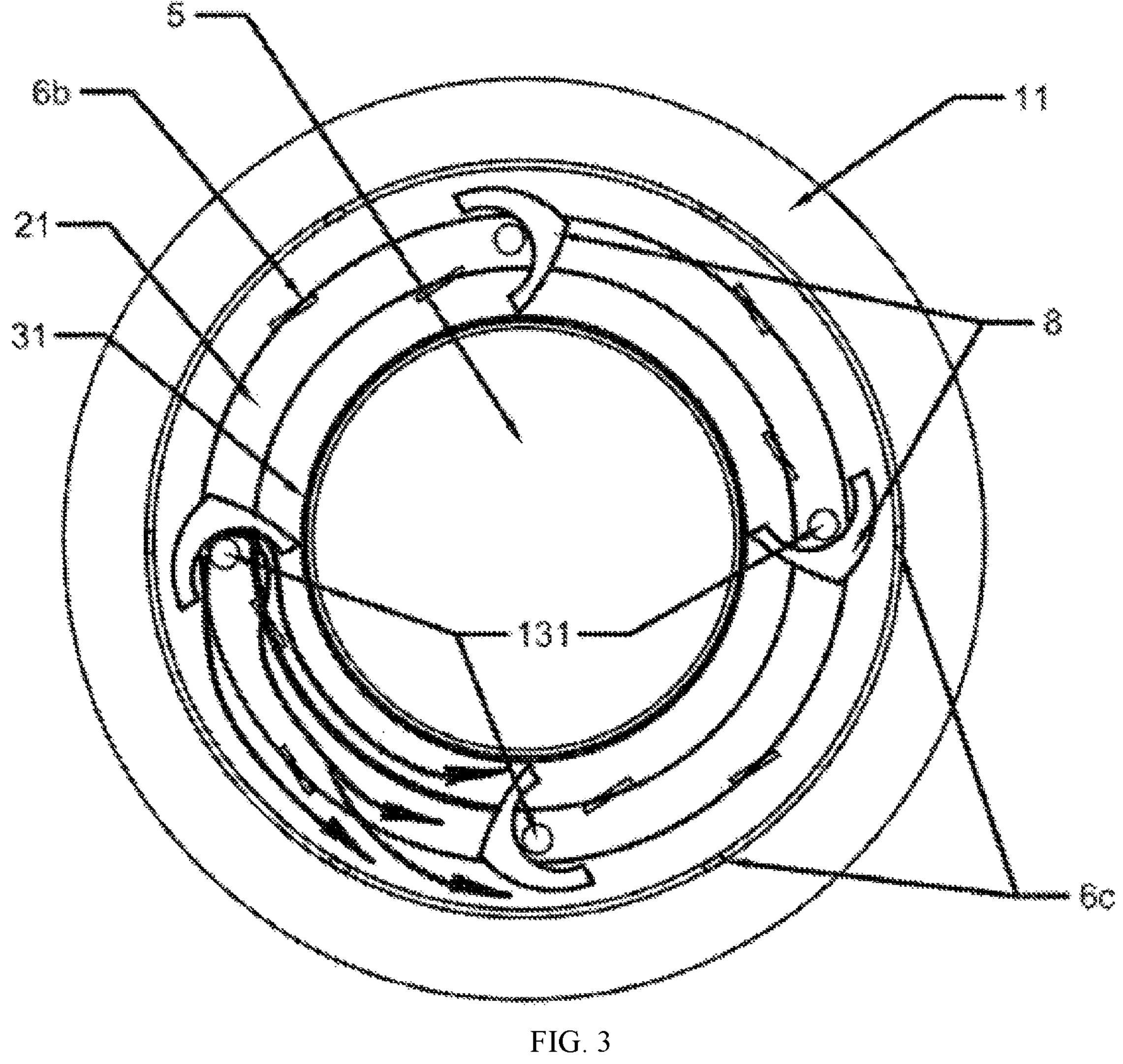
FIG. 3 is a schematic view of a layout structure and airflow guidance of an air duct structure block corresponding to an upper excitation of the air-cooling mechanism of the electric vibrating table according to a preferred embodiment of the present disclosure.
Figure 4:
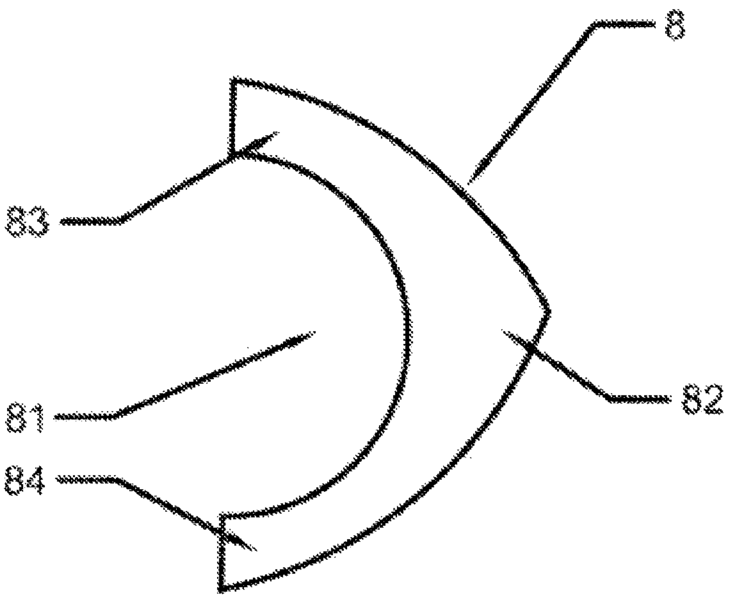
FIG. 4 is a detailed schematic view of the duct structure block in the preferred embodiment of FIG. 3.
Figure 5:
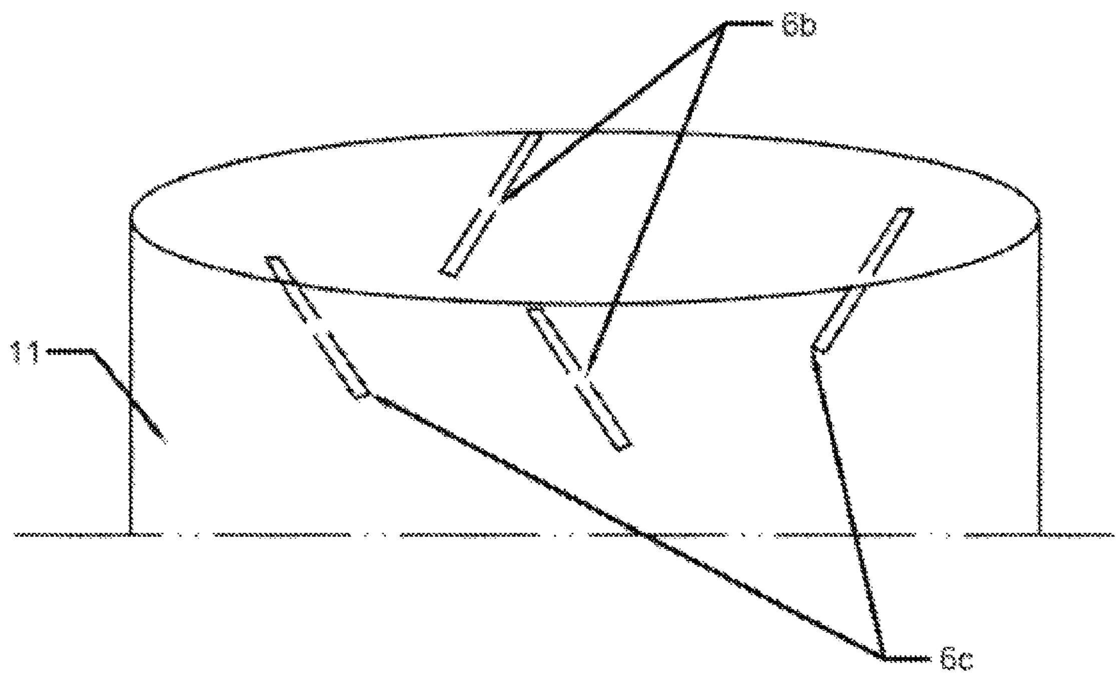
FIG. 5 is a partial schematic view of an insertion state of each flow guiding block in the preferred embodiment of FIG. 3.

A preferred embodiment of the optimization of the air-cooling mechanism is shown in FIGS. 3 to 5, in which the air duct structure block is a sheet body with a thickness of about 6 mm. Each air duct structure block is provided with a diversion corner 82, an outer end corner 83, and an inner end corner 84 distributed in a triangle with curved edges, and a semi-opened groove 81 is provided between the outer end corner and the inner end corner. In the preferred embodiment shown in the figure, the semi-opened groove 81 is provided as a circular arc groove, and the diversion corner 82 on a back side is provided as a curved sharp corner that guides the airflow. A radial position of a vertex of the outer end corner 83 does not exceed an outer edge of the excitation coil, and a radial position of a vertex of the inner end corner 84 does not exceed an inner edge of the excitation coil. That is, the radial position of the respective vertex is located between inner and outer edges of the excitation coil. The diversion corner 82 is mainly configured to divide the cooling airflow flowing through it to form two airflows directed toward the inner end corner and the outer end corner, respectively. The inner end corner 84 is mainly configured to guide the aforementioned divided airflow into a gap around the moving coil to form a top-down airflow with a certain circumferential trend without dead ends. Similarly, the outer end corner 83 is configured to guide the other divided airflow into a gap around an inner wall of the cylinder body to form an airflow without dead ends.

Moreover, the semi-opened groove of each air duct structure block provided on the surface of the excitation coil coincides with or is adjacent to each air inlet in the axial direction. The semi-opened groove of each air duct structure block provided between the excitation coil and the magnetic cylinder bottom is axially coincide with or adjacent to the ventilation hole. The main function of this semi-opened groove is to diffuse the one-way downward airflow in all directions, under limited spatial height conditions, while form a guided airflow, and an active radial intervention of the airflow is carried out before entering each gap. For the purpose of minimizing wind resistance, the shape and the position of the diversion corner, as well as the design of the side edge between the three corners as the diversion curve edge, are designed together with the semi-opened grooves, and are finalized after the airflow is simulated and optimized using computer software simulation.

In the electric vibrating table of this embodiment as shown in FIG. 3, it is assumed that the air inlet is four circular holes evenly distributed in the circumferential direction, and four air duct structure blocks 8 are evenly distributed along the circumferential direction on the surface of the upper excitation 21, and the inner end corner and the outer end corner of each air duct structure block are adjacent to the corresponding gaps respectively, and the diversion corner is located in a middle portion of a width direction of the excitation coil and opposite to the semi-opened groove of the adjacent air duct structure block. As a relatively main part of the air-cooling mechanism, the air duct structure block 8 replaces the conventional rectangular spacer block 7, which has allowed the cooling airflow in the vibrating table to form a new path that breaks through the straight down circulation through the improved air duct. It can be seen from the schematic view of an airflow guidance in the figure that, the cooling airflow is usually sucked directly into the inner cavity of the magnetic cylinder body from the air inlet 131 (shown as a small circle in the figure) of the magnetic cylinder cover 13. However, due to the limited spatial height, the airflow will diffuse in all directions after being in contact with the surface of the upper excitation. When there is an air duct structure block nearby, the diffused airflow will be guided by the semi-opened groove, flowing from a place that first is in contact with a side wall of the semi-opened groove to a place farther away from the side wall of the semi-opened groove, so that the airflow path which is diffused clockwise adjacent to the small hole shown in the figure is formed. At the same time, since outer walls of the central magnetic pole and the moving coil are arc surfaces, the diffused cooling airflow is again directed into a circulating flow (shown by the three thick lines in the figure) that conforms to the excitation coil. This circulating flow is not in a constant state of counterclockwise diffusion. When the circulating flow reaches the previous air duct structure block, it will be divided into two directional airflows by the diversion corner, and part of which will flow towards the inner end corner and flow into the gap adjacent to the moving coil. In this way, the full-width and long-path contact heat exchange can be carried out for the moving coil, which is one of the main heating objects of the vibrating table, and the cooling effect is significant and long-lasting. While the other part of the airflow flows towards the outer end corner and flows into the gap adjacent to the inner wall of the cylinder body. The outer surface of the excitation coil is cooled in a manner similar to that described above. By analogy, this diversion flow will be transmitted one by one along with the distribution of the air duct structure blocks to form a circumferential closed loop.

As shown in FIG. 3 and FIG. 5, it can also be seen that flow guiding blocks **6*b* inserted in a body of the excitation coil is inclined relative to the axial direction of the central magnetic pole 5. In addition, in the circumferential direction of the upper excitation, two adjacent air duct structure blocks can be opposite to each other in a completely empty space, and the flow guiding blocks 6*b* can optionally be slightly exposed outward to distribute the airflow between the two air duct structure blocks. Flow guiding blocks 6*c* inserted between the excitation coil and the inner wall of the magnetic cylinder body is also inclined relative to the axial direction of the central magnetic pole, and an attachment density of the outermost peripheral flow guiding block 6*c*** is higher than an attachment density of the air duct structure block.

Figure 6:
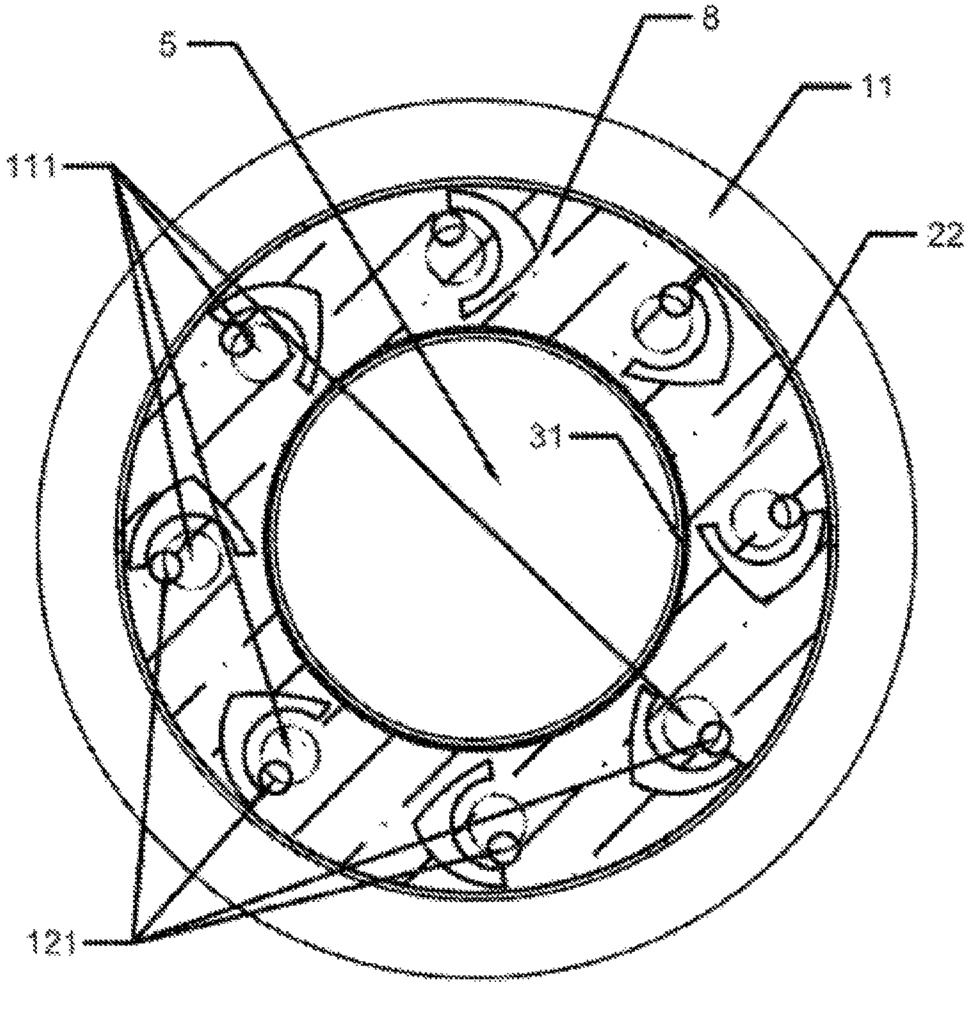
FIG. 6 is a schematic view of a layout structure of the air duct structure block corresponding to a bottom side of a lower excitation in the preferred embodiment of FIG. 3.

As shown in FIG. 2 and FIG. 6, the air-cooling optimization further includes a plurality of air duct structure blocks 8 provided between the bottom surface of the lower excitation and the magnetic cylinder bottom. The air duct structure blocks 8 are flatly attached to the surface of the magnetic cylinder bottom 12 and evenly distributed along the circumferential direction of the lower excitation 22 to increase the attachment density. As shown in the figure, the number has been increased to eight, and each air duct structure block 8 is also provided with an inner end corner, an outer end corner, a diversion corner, which are distributed in a curved triangular manner, and a semi-opened groove between the inner end corner and outer end corner. The center of the semi-opened groove is axially coincide with the relatively upper air duct hole 111 and is adjacent to the relatively lower ventilation hole 121. The inner end corner matches the gap adjacent to the moving coil, and the outer end corner matches the outermost gap, which is similar to that air duct structure block arrange on the surface of the excitation coil in the preferred implementation. The difference is that the diversion curved edge of the air duct structure block is slightly adjusted to increase or decrease in size, and the air flow structure block is finalized after the airflow is simulated and optimized by computer software simulation. Certainly, an air duct structure block for adjusting an airflow direction can also be sandwiched between the surface of the lower excitation 22 and the support protrusion.

Figure 7:
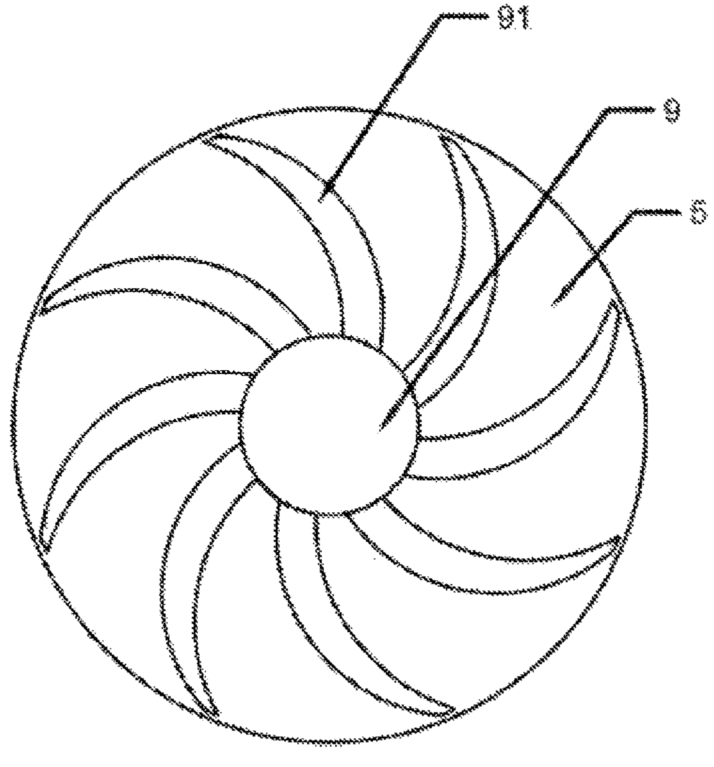
FIG. 7 is a top view of an air-cooling mechanism of an electric vibrating table according to another embodiment of the present disclosure.

In addition to the above embodiments, as another optional embodiment of the electric vibrating table, when the center of the magnetic cylinder cover 13 is provided with an air inlet and a top surface of the central magnetic pole is spaced apart from the magnetic cylinder cover 13 by a certain distance, a flow guiding structure block that diffuses the airflow passing through the air inlet hole outwards may also be additionally provided. As shown in FIG. 7, the flow guiding structure block 9 includes more than three arc-shaped flow guiding ribs 91, all of which are evenly distributed in the circumferential direction and bent in the same direction. In this way, when the cooling airflow enters from the central air inlet, it does not directly diffuse outward in the shortest radius path. Instead, it is guided by blades and diffuses non-linearly on the top surface of the central magnetic pole. Specifically, it diffuses along a curved shape of the blades.

Figure 8:
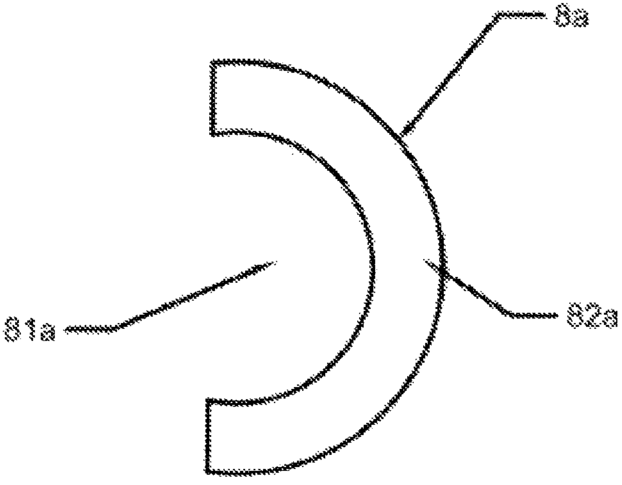
FIG. 8 is a schematic view of another implementation shape of the duct structure block according to the present disclosure.
Figure 9:
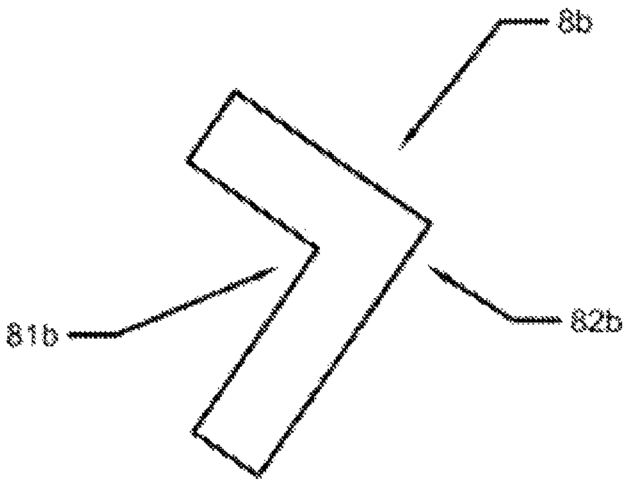
FIG. 9 is a schematic view of yet another implementation shape of the duct structure block in the present disclosure.

Moreover, the shape characteristics of the above-mentioned air duct structure block include but are not limited to the preferred embodiment shown in FIG. 4. That is, both a shape of the semi-opened groove and a shape of the other side opposite to the semi-opened groove have diverse real-time properties. For example, in the air duct structure block 8*a* shown in FIG. 8, its semi-opened groove 81*a* is an arc groove, and the diversion corner 82*a* corresponding to a back side is an arc surface with an increased outer diameter. In the air duct structure block 8*b* shown in FIG. 9, the semi-opened groove 81*b* is a straight-edge groove, and the corresponding diversion corner 82*b* on the back side is a straight-edge sharp angle, with an angle ranging from 60° to 110°.

Figure 10:
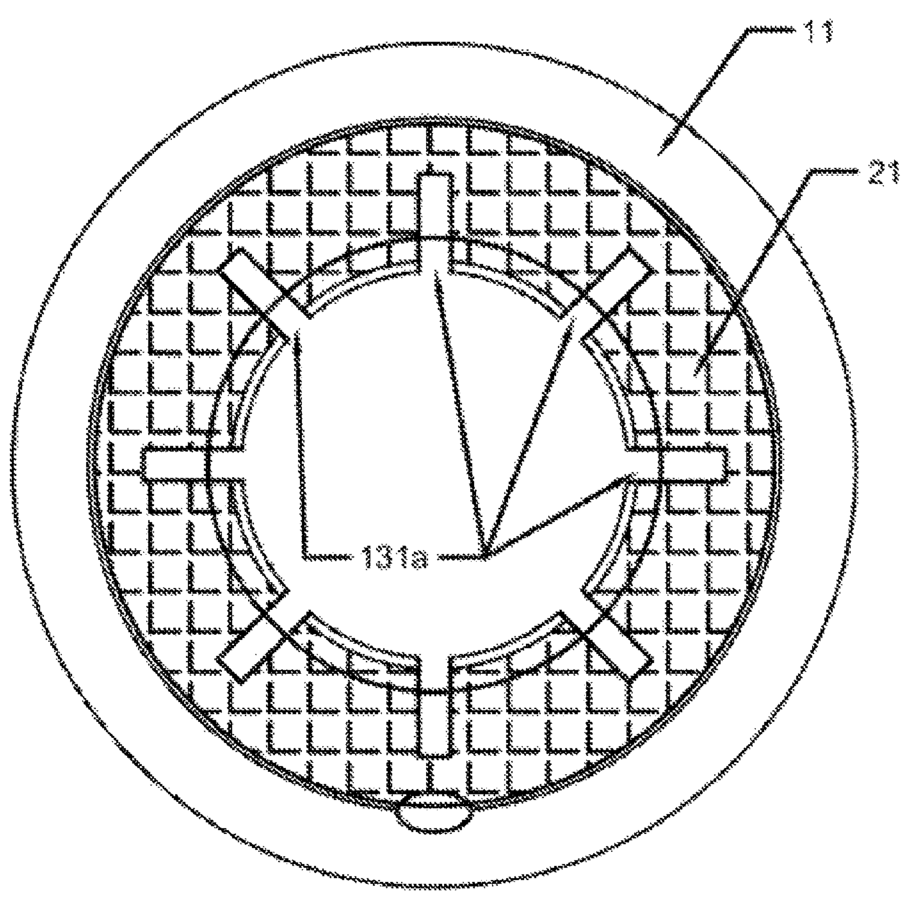
FIG. 10 is a schematic view of another implementation shape of an air inlet provided in the magnetic cylinder cover of the air-cooling mechanism of the vibrating table according to the present disclosure.
Figure 11:
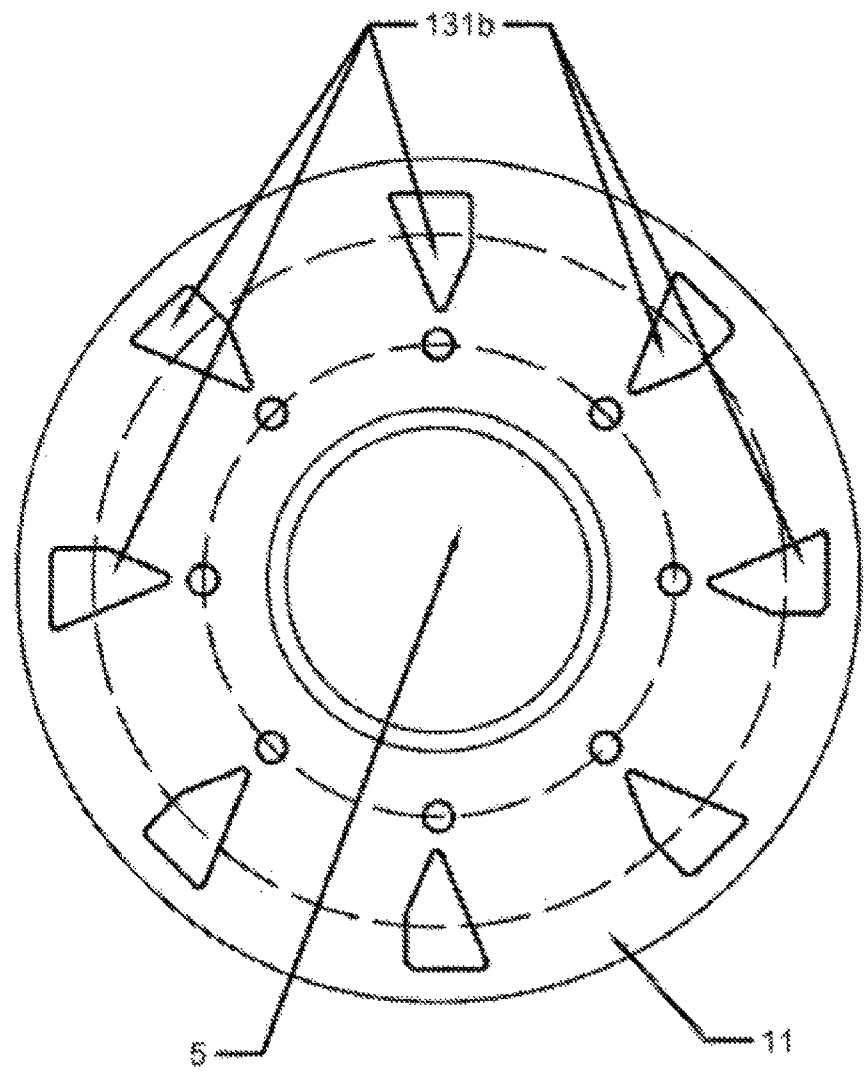
FIG. 11 is a schematic view of yet another implementation shape of the air inlet provided in the magnetic cylinder cover of the air-cooling mechanism of the vibrating table according to the present disclosure.

It should be noted that the air inlet and air outlet of the cooling air duct of the electric vibrating table usually adopt circular holes for the convenience of processing. But in addition, other implementation structures that are more conducive to guidance and diversion of the airflow can also be used. For example, the air inlet and air outlet can be an opened groove 131*a* facing the central axis shown in FIG. 10, or the irregular shaped hole 131*b* shown in FIG. 11, etc.

In summary, it can be seen from the introduction and detailed description of the embodiments of the air-cooling electric vibrating table of the present disclosure that this solution has substantial features and progress: by improving the structure of the spacer block into a specially shaped air duct structure block and replacing the assembly, the airflow is guided through the air duct, the direction of the cooling airflow is changed from straight downward to multi-strand rotation from top to bottom, and each corner of all gaps is completely covered. In addition, by optimizing an insertion state of the flow guiding block and combining with the diversion effect of the air duct structure block, the cooling airflow form a multi-layered overall airflow without dead ends outside the central magnetic pole, thereby extending the cooling path by tens of times and improving the flow controllability and cooling effect of the cooling airflow for the moving coil, the excitation coil, etc.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A novel air-cooling electric vibrating table, comprising a magnetic cylinder body, a magnetic cylinder cover, a magnetic cylinder bottom, a lower air cover, and an upper cover, the magnetic cylinder body being internally provided with a central magnetic pole, a moving coil, and an excitation coil whose central axes coincide and that are arranged from the inside to the outside, the magnetic cylinder cover being provided with air inlets circumferentially distributed corresponding to the excitation coil, the magnetic cylinder bottom supporting and fixing the central magnetic pole and carrying the excitation coil, the magnetic cylinder bottom being provided with ventilation holes distributed in a projection area of the excitation coil, the ventilation holes being in communication with an air outlet on a bottom side of the lower air cover and externally connected to an air duct and a blower, the moving coil extending upward to a moving coil table above the magnetic cylinder cover, and extending downward from a center of the moving coil table to be connected to a support air spring in an inner cavity of the central magnetic pole, wherein the magnetic cylinder body is provided with air duct structure blocks that are discontinuous and evenly distributed along a circumferential direction of the excitation coil, the air duct structure blocks are arranged at least one place on a surface of the excitation coil and between the excitation coil and the magnetic cylinder bottom, and a shape and a number of the air duct structure blocks provided at each place are the same or different; the air duct structure block is provided with a diversion corner, an outer end corner, and an inner end corner that are distributed in a triangle with curved edges, and a semi-opened groove is provided between the outer end corner and the inner end corner, an opening of each air duct structure block orients a circumferential direction of the cavity and is consistent, a radial position of each vertex of the outer end corner and the inner end corner is located between inner and outer edges of the excitation coil, the semi-opened groove of each air duct structure block provided on the surface of the excitation coil axially coincides with or is adjacent to each air inlet, and the semi-opened groove of each air duct structure block provided between the excitation coil and the magnetic cylinder bottom axially coincides with or is adjacent to the ventilation hole.

2. The novel air-cooling electric vibrating table according to claim 1, wherein the semi-opened groove of the air duct structure block is an arc groove or an angled straight-edge groove.

3. The novel air-cooling electric vibrating table according to claim 1, wherein the diversion corner of the air duct structure block is a rounded or sharp corner away from the semi-opened groove for wind-guided diversion, and a diversion angle ranges from 60° to 110°.

4. The novel air-cooling electric vibrating table according to claim 1, wherein a middle portion of the magnetic cylinder body is provided with an annular support protrusion extending inwardly, the excitation coil comprises an upper excitation and a lower excitation that are spaced up and down in the magnetic cylinder body based on the support protrusion and laminated for positioning, the air duct structure blocks are provided between the magnetic cylinder cover and the surface of the upper excitation, between a bottom surface of the upper excitation and the support protrusions, between the support protrusions and the surface of the lower excitation, and between a bottom surface of the lower excitation and the magnetic cylinder bottom, and the support protrusion is provided with an air duct hole that penetrates from top to bottom corresponding to the semi-opened groove of each air duct structure block.

5. The novel air-cooling electric vibrating table according to claim 1, wherein a plurality of flow guide blocks are inserted between the excitation coil and an inner wall of the magnetic cylinder body, the flow guiding blocks are axially inclined relative to the central magnetic pole, and the flow guiding blocks are distributed annularly along an outer cylindrical surface of the excitation coil.

6. The novel air-cooling electric vibrating table according to claim 1, wherein a plurality of flow guiding blocks are inserted in a body of the excitation coil, the flow guiding blocks are axially inclined relative to the central magnetic pole, and the guide blocks located in the same layer of gaps are distributed annularly.

7. The novel air-cooling electric vibrating table according to claim 1, wherein an upper surface of the central magnetic pole is provided with a flow guiding structure block, the flow guiding structure block comprises more than three arc-shaped flow guiding ribs, and the arc-shaped flow guiding ribs are evenly distributed in the circumferential direction and bent in the same direction.

8. The novel air-cooling electric vibrating table according to claim 1, wherein a shape of the air inlet is a circular hole, an irregular shaped hole or an opened groove facing a central axis.

* * * * *